United States Patent
Croak et al.

(10) Patent No.: US 9,282,198 B2
(45) Date of Patent: *Mar. 8, 2016

(54) METHOD AND APPARATUS FOR PROVIDING SPECIAL CALL HANDLING FOR VALUED CUSTOMERS OF RETAILERS

(71) Applicant: AT&T Intellectual Property II, L.P., Atlanta, GA (US)

(72) Inventors: Marian Croak, Fair Haven, NJ (US); Hossein Eslambolchi, San Diego, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,926

(22) Filed: Jun. 16, 2014

(65) Prior Publication Data

US 2014/0294166 A1 Oct. 2, 2014

Related U.S. Application Data

(63) Continuation of application No. 13/975,784, filed on Aug. 26, 2013, now Pat. No. 8,755,496, which is a continuation of application No. 12/861,150, filed on Aug. 23, 2010, now Pat. No. 8,520,811, which is a continuation of application No. 11/014,565, filed on Dec. 16, 2004, now Pat. No. 7,783,024.

(51) Int. Cl.
- *H04M 15/00* (2006.01)
- *H04L 12/725* (2013.01)
- *G06Q 30/06* (2012.01)
- *H04M 3/38* (2006.01)
- *H04M 3/42* (2006.01)

(52) U.S. Cl.
CPC ....... *H04M 15/8011* (2013.01); *G06Q 30/0633* (2013.01); *H04L 45/30* (2013.01); *H04M 3/38* (2013.01); *H04M 3/42187* (2013.01); *H04M 3/42059* (2013.01); *H04M 3/42161* (2013.01)

(58) Field of Classification Search
CPC .............. H04M 15/8011; H04M 3/38; H04M 3/42187; H04M 3/42059; H04M 3/42161; H04L 45/30; G06Q 30/0633
USPC ............... 370/229, 395.2; 379/88.21, 114.13, 379/211.02, 212.01, 265.09, 88.19, 197, 379/210, 221.13, 243, 381; 704/270.1; 455/433
See application file for complete search history.

(56) References Cited

U.S. PATENT DOCUMENTS

| | | | | |
|---|---|---|---|---|
| 4,958,153 A | * | 9/1990 | Murata | H04M 1/253 370/462 |
| 5,742,675 A | | 4/1998 | Kilander et al. | |
| 5,796,816 A | * | 8/1998 | Utsumi | H04M 1/2745 370/264 |
| 5,872,840 A | * | 2/1999 | Wu | H04M 3/436 379/197 |
| 5,946,386 A | * | 8/1999 | Rogers et al. | 379/265.09 |
| 5,949,782 A | * | 9/1999 | Wells | H04L 49/3081 370/395.2 |
| 6,047,268 A | | 4/2000 | Bartoli et al. | |
| 6,061,057 A | | 5/2000 | Knowlton et al. | |
| 6,061,436 A | * | 5/2000 | Bauer | H04M 15/00 379/114.01 |
| 6,104,799 A | * | 8/2000 | Jain | H04M 3/46 379/201.01 |

(Continued)

*Primary Examiner* — Gerald Gauthier

(57) ABSTRACT

The present invention enables users of a network service to register with the network as valued shoppers, thereby allowing them to receive specialized treatment when calling registered retailers. The present invention enables retailers to register with the network, thereby allowing them to set preferred service logic for handling valued customer calls by the network.

20 Claims, 5 Drawing Sheets

(56) References Cited

U.S. PATENT DOCUMENTS

| | | | |
|---|---|---|---|
| 6,105,520 A | 8/2000 | Frazer et al. | |
| 6,141,006 A | 10/2000 | Knowlton et al. | |
| 6,443,843 B1 | 9/2002 | Walker et al. | |
| 6,577,718 B1 | 6/2003 | Kalmanek, Jr. et al. | |
| 6,639,981 B1 * | 10/2003 | Dunn, Jr. | H04L 29/06 379/221.08 |
| 6,914,970 B2 | 7/2005 | Huang et al. | |
| 6,965,872 B1 | 11/2005 | Grdina | |
| 6,987,969 B1 * | 1/2006 | Brunig | H04Q 3/005 455/412.1 |
| 6,996,534 B2 | 2/2006 | Hamaguchi et al. | |
| 7,069,251 B1 | 6/2006 | Bartz et al. | |
| 7,100,821 B2 | 9/2006 | Rasti | |
| 7,236,577 B2 | 6/2007 | Lection et al. | |
| 7,248,565 B1 | 7/2007 | Fourie | |
| 7,390,264 B2 | 6/2008 | Walker et al. | |
| 7,398,212 B2 * | 7/2008 | Yacoub | 704/270.1 |
| 7,433,456 B2 | 10/2008 | Huang et al. | |
| 7,682,249 B2 | 3/2010 | Winans et al. | |
| 7,733,850 B1 | 6/2010 | Croak et al. | |
| 7,751,359 B1 | 7/2010 | Bienn et al. | |
| 7,783,024 B1 * | 8/2010 | Croak | G06Q 30/0633 235/380 |
| 7,917,394 B2 | 3/2011 | Borelli et al. | |
| 8,520,811 B2 * | 8/2013 | Croak | G06Q 30/0633 379/212.01 |
| 8,755,496 B2 * | 6/2014 | Croak | G06Q 209/583 209/583 |
| 2001/0037263 A1 | 11/2001 | Hirota et al. | |
| 2001/0038624 A1 | 11/2001 | Greenberg et al. | |
| 2002/0082925 A1 | 6/2002 | Herwig | |
| 2003/0055674 A1 | 3/2003 | Nishiyama | |
| 2003/0065554 A1 | 4/2003 | Bataveljic et al. | |
| 2003/0069785 A1 | 4/2003 | Lohse | |
| 2003/0086546 A1 | 5/2003 | Falcone et al. | |
| 2003/0117953 A1 * | 6/2003 | Kinahan et al. | 370/229 |
| 2003/0221108 A1 | 11/2003 | Rupp | |
| 2004/0114537 A1 | 6/2004 | Kaufman et al. | |
| 2004/0141598 A1 * | 7/2004 | Moss | H04M 3/436 379/88.19 |
| 2005/0055266 A1 | 3/2005 | Foth et al. | |
| 2005/0141691 A1 | 6/2005 | Wengrovitz | |
| 2005/0153717 A1 | 7/2005 | Hauglum | |
| 2005/0163302 A1 * | 7/2005 | Mock et al. | 379/211.02 |
| 2005/0203755 A1 * | 9/2005 | Krishnamoorthy | 705/1 |
| 2005/0240424 A1 * | 10/2005 | Lin et al. | 705/1 |
| 2006/0140381 A1 | 6/2006 | Croak et al. | |
| 2007/0012602 A1 | 1/2007 | Baldassari et al. | |
| 2008/0249879 A1 | 10/2008 | Walker et al. | |
| 2009/0103526 A1 | 4/2009 | Croak et al. | |
| 2009/0228336 A1 | 9/2009 | Giordano et al. | |
| 2010/0316200 A1 * | 12/2010 | Croak | G06Q 30/0633 379/88.21 |
| 2011/0003630 A1 | 1/2011 | Rasmussen et al. | |
| 2013/0343533 A1 * | 12/2013 | Croak | G06Q 30/0633 379/243 |
| 2014/0294166 A1 * | 10/2014 | Croak | G06Q 30/0633 379/114.13 |

* cited by examiner

METHOD AND APPARATUS FOR PROVIDING SPECIAL CALL HANDLING FOR VALUED CUSTOMERS OF RETAILERS

This application is a continuation of U.S. patent application Ser. No. 13/975,784, filed Aug. 26, 2013, now U.S. Pat. No. 8,755,496, and is a continuation of U.S. patent application Ser. No. 12/861,150, filed Aug. 23, 2010, now U.S. Pat. No. 8,520,811, and is a continuation of U.S. patent application Ser. No. 11/014,565, filed on Dec. 16, 2004, now U.S. Pat. No. 7,783,024, all of which are incorporated herein by reference in their entirety.

FIELD OF THE INVENTION

The present invention relates generally to communication networks and, more particularly, to a method and apparatus for providing special call handling for valued customers of retailers.

BACKGROUND OF THE INVENTION

Users frequently call retailers for information to facilitate shopping and purchase decisions. If valued customers' calls can be handled differently with more focused marketing and customer care service from regular customers, more effective sales and higher customer satisfaction and revenue can result from this type of enhanced call handling.

Therefore, a need exists for a method and apparatus for providing special call handling for valued customers of retailers.

SUMMARY OF THE INVENTION

In one embodiment, the present invention enables users of a network service, e.g., a VoIP network service, to register with the network as valued shoppers allowing them to receive specialized treatment when calling registered retailers, e.g., by dialing the toll free number (e.g., 800 number) of the retailers. The present invention enables the retailers to register with the network, thereby allowing them to set preferred service logic for handling valued customer calls by the network. For example, the network will receive information with the caller identification of these registered customers, thereby prompting the registered retailers to offer their valued customers special promotions or enhanced customer care services.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
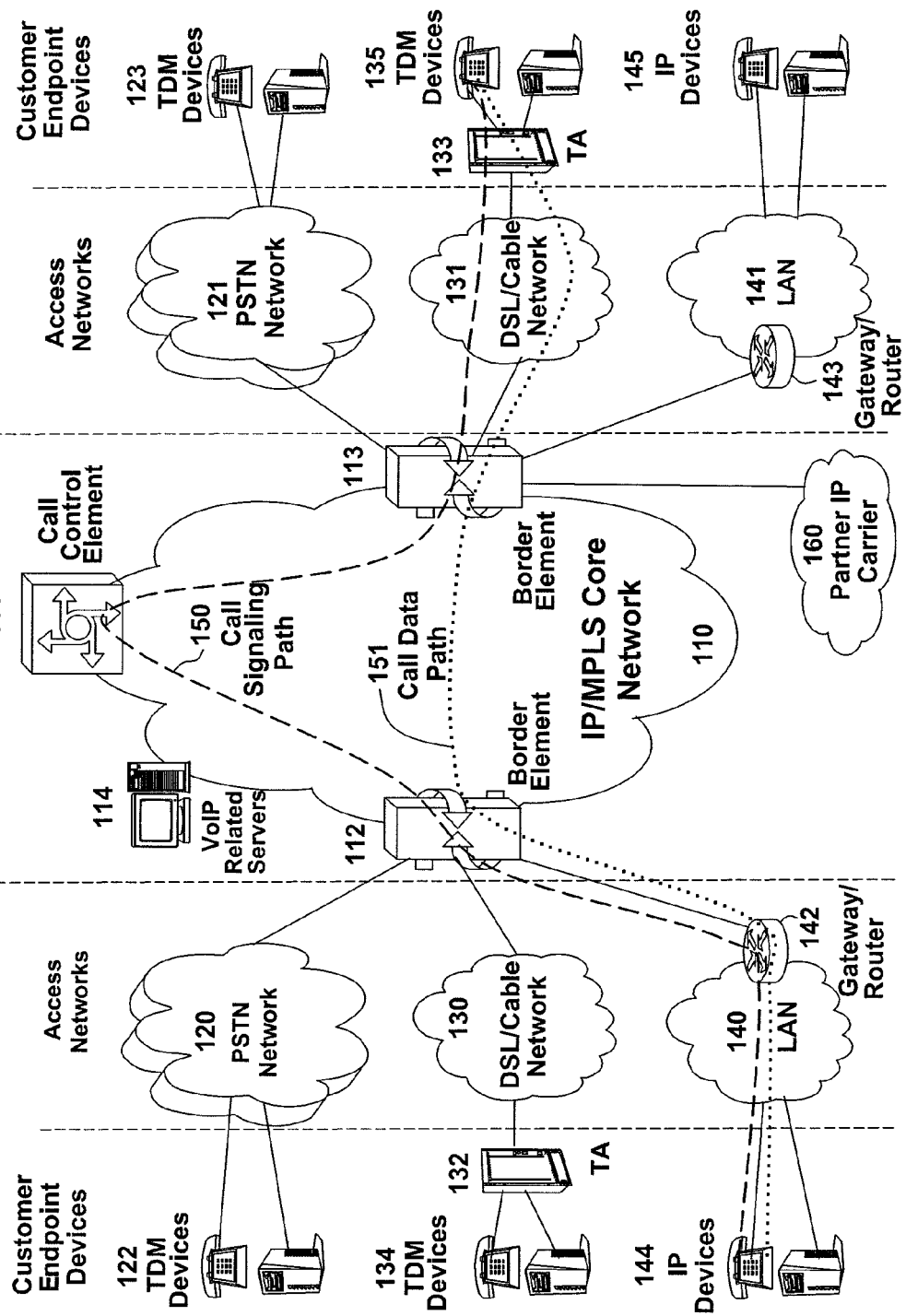
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Users may call retailers (e.g., the retailers' toll free number) for information to facilitate shopping. If valued customers' calls can be handled differently, with more focused marketing and enhanced customer care services, from regular customers, more effective sales and higher customer satisfactions and revenue can result from this type of enhanced call handling.

Figure 2:
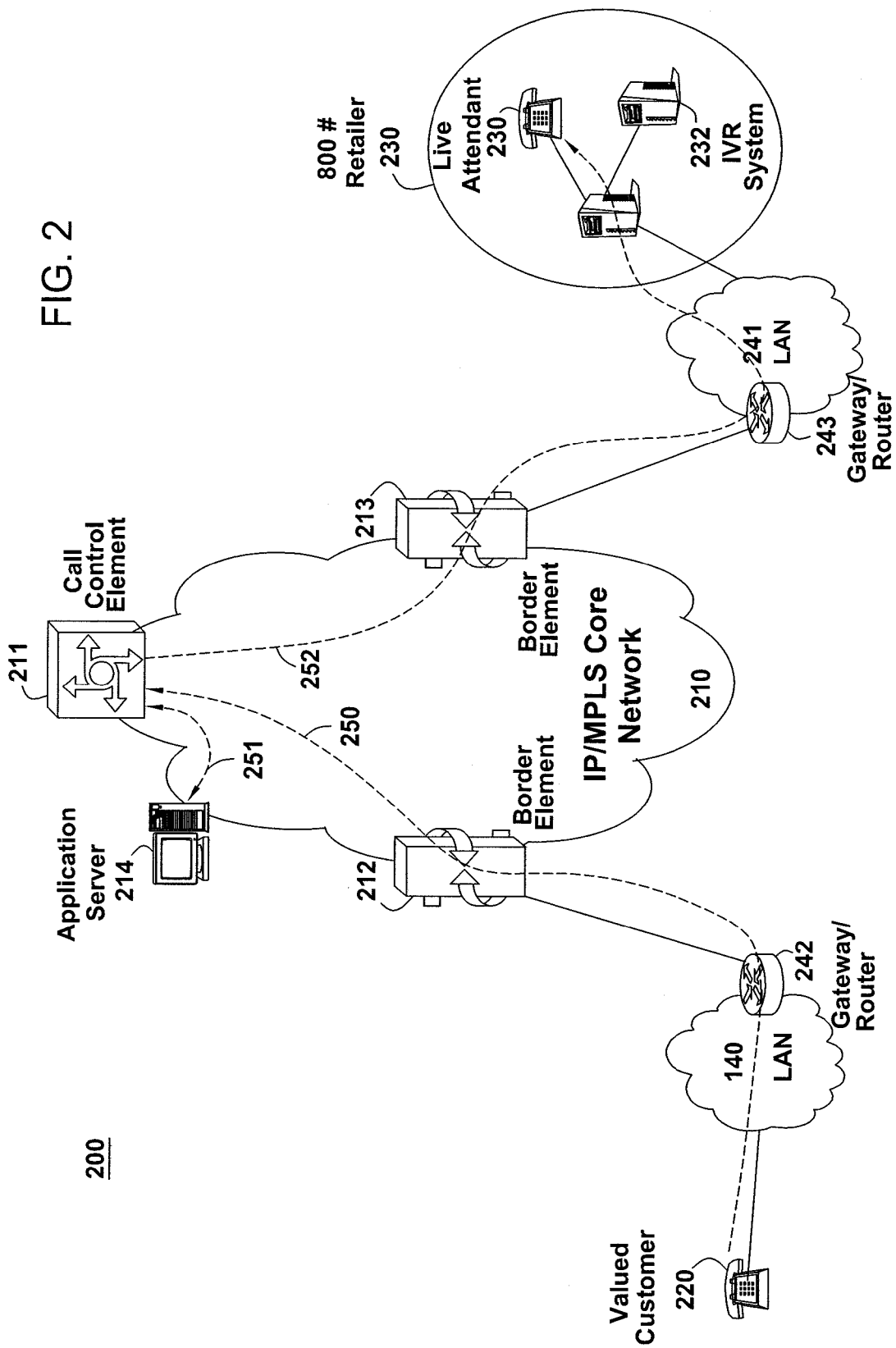
FIG. 2 illustrates an example of enabling special call handling for valued customers of retailers of the present invention.
Figure 3:
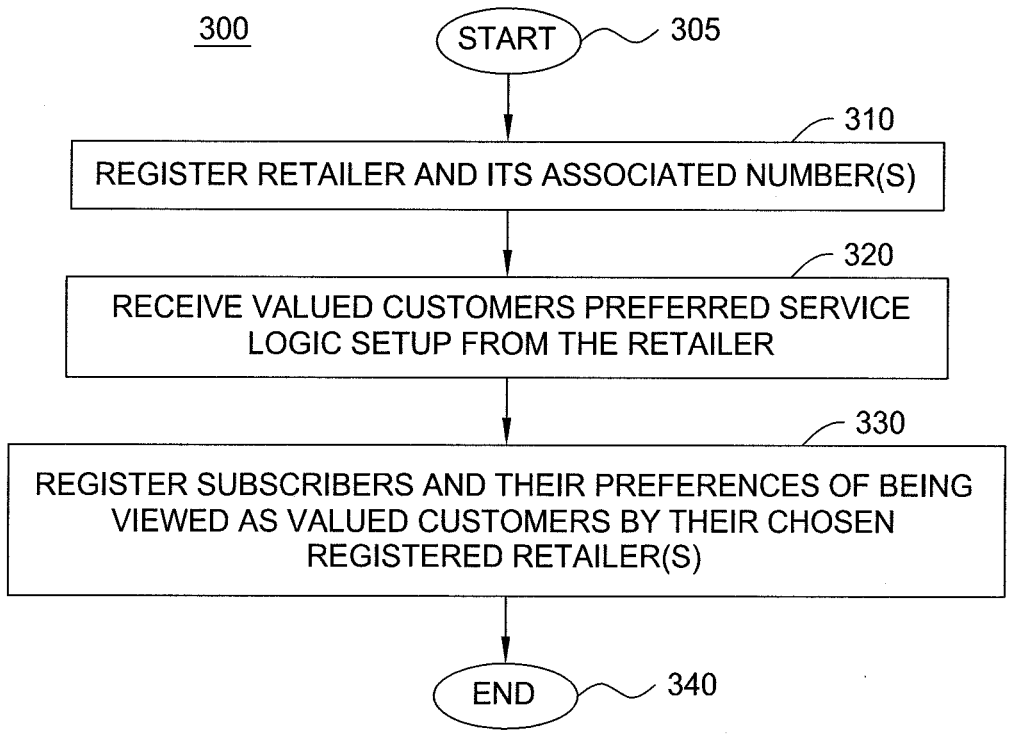
FIG. 3 illustrates a flowchart of a method for registering retailers and valued customers in a VoIP network of the present invention.

FIG. 2 illustrates an example of providing special call handling for valued customers of retailers. Registered retailers 230 and registered valued customers 220 information are stored in the Application Server (AS) 214. For retailers, information stored in AS 214 includes, but is not limited to, preferred service logic to handle incoming calls from valued customers. For example, a valued customer may be forwarded to a live attendant 231 instead of being forwarded to an interactive voice response (IVR) system 232. For customers, information stored in AS 214 includes, but is not limited to, their preferences to be viewed as a valued customer by a list of chosen registered retailers. For example, a customer may only want to be viewed as a valued customer for a preferred subset of registered retailers that they shop with. FIG. 2 shows that when CCE 211 receives a call 250 from a valued customer 220 via LAN 240, gateway/router 242 and BE 212 that is destined to retailer 230, the CCE finds out that the calling number is a registered valued customer and the called number (e.g., a 800 number of a retailer) is a registered retailer. Then CCE 211 communicates with AS 214, event 251, and finds out that customer 220 prefers to be viewed as a valued customer for the retailer 230; therefore, CCE 211 retrieves the registered service logic set by retailer 230 and processes the call according to the retrieved service logic. For instance, the retailer 230 prefers to answer all valued customer calls using live attendants 231 immediately instead of using an IVR system, as is the case for regular customers. CCE 211 then translates the called retailer number (e.g., a toll or a toll free number) into a telephone number destined to live attendants and continues the original call setup along with the valued customer's caller identification (ID), such as the name and the phone number, towards the destined translated phone number as shown in event 252, e.g., via BE 213, gateway/router 243 and LAN 241. Using the transmitted caller ID information, retailer 230 can also verify that caller 220 is indeed a valued customer before the call is answered by a live attendant 231. If the caller is really a valued customer, based on such as billing status or revenue history, then the call will be answered by a live attendant; otherwise, the call will in turn be forwarded to an IVR system instead. In an alternative embodiment, the retailer 230 can also play pre-recorded messages of special promotions to the verified valued customer caller before a live attendant 231 answers the call.

FIG. 2 illustrates an example of providing special call handling for valued customers of retailers. Registered retailers 230 and registered valued customers 220 information are stored in the Application Server (AS) 214. For retailers, information stored in AS 214 includes, but is not limited to, preferred service logic to handle incoming calls from valued customers. For example, a valued customer may be forwarded to a live attendant 231 instead of being forwarded to an interactive voice response (IVR) system 232. For customers, information stored in AS 214 includes, but is not limited to, their preferences to be viewed as a valued customer by a list of chosen registered retailers. For example, a customer may only want to be viewed as a valued customer for a preferred subset of registered retailers that they shop with. FIG. 2 shows that when CCE 211 receives a call 250 from a valued customer 220 via LAN 240, gateway/router 242 and BE 212 that is destined to retailer 230, the CCE finds out that the calling number is a registered valued customer and the called number (e.g., a 800 number of a retailer) is a registered retailer. Then CCE 211 communicates with AS 214, event 251, and finds out that customer 220 prefers to be view as a valued customer for the retailer 230; therefore, CCE 211 retrieves the registered service logic set by retailer 230 and processes the call according to the retrieved service logic. For instance, the retailer 230 prefers to answer all valued customer calls using live attendants 231 immediately instead of using an IVR system, as is the case for regular customers. CCE 211 then translates the called retailer number (e.g., a toll or a toll free number) into a telephone number destined to live attendants and continues the original call setup along with the valued customer's caller identification (ID), such as the name and the phone number, towards the destined translated phone number as shown in event 252, e.g., via BE 213, gateway/router 243 and LAN 241. Using the transmitted caller ID information, retailer 230 can also verify that caller 220 is indeed a valued customer before the call is answered by a live attendant 231. If the caller is really a valued customer, based on such as billing status or revenue history, then the call will be answered by a live attendant; otherwise, the call will in turn be forwarded to an IVR system instead. In an alternative embodiment, the retailer 230 can also play pre-recorded messages of special promotions to the verified valued customer caller before a live attendant 231 answers the call.

In step 310, the method registers at least one phone number of a retailer that has signed up for the special call handling of valued customers service feature. The at least one number of the registered retailer can be a toll number or a toll free number such as an 800 number. Namely, the retailer is subscribing to this unique service with the service provider so that the retailer has the ability to identify and to handle its valued customers in a different manner. In fact, once registered, the registered retailer may be presented on a list of registered retailers that have special handling logics. In turn, users can opt to be treated as a valued customer by one or more of these registered retailers.

In step 310, the method registers at least one phone number of a retailer that has signed up for the special call handling of valued customers service feature. The at least one number of the registered retailer can be a toll number or a toll free number such as an 800 number. Namely, the retailer is subscribing this unique service with the service provider so that the retailer has the ability to identify and to handle its valued customers in a different manner. In fact, once registered, the registered retailer may be presented on a list of registered retailers that have special handling logics. In turn, users can opt to be treated as a valued customer by one or more of these registered retailers.

In step 320, the method registers the preferred service logic of the retailers on how a valued customer's call should be handled by the network. For example, the valued customer's call can be forwarded to a live attendant. Alternatively, the valued customer's call is forwarded to an IVR with specialized announcements (e.g., specials, discounts, discount or coupon codes, or private sales) that are made available only to value customers.

In step 330, the method registers one or more customers as valued customers of their chosen registered retailers. This registration process may contain two perspectives. In one perspective, each customer can select which registered retailers that should treat him or her as a valued customer. In addition to this perspective, the registered retailers may also have a preference as to who should be treated as their valued customers. For example, customers who want to be valued customers are automatically treated as tier 1 valued customers by a registered retailer. However, if the registered retailer has additional information on a particular customer, e.g., a customer who frequently shops at the retailer, e.g., based on credit card or billing information, then the registered retailer may elevate that particular customer to a tier 2 valued customer and so on. The registered retailer has discretion as to how a valued customer should be handled. Method 300 then ends in step 340.

Figure 4:
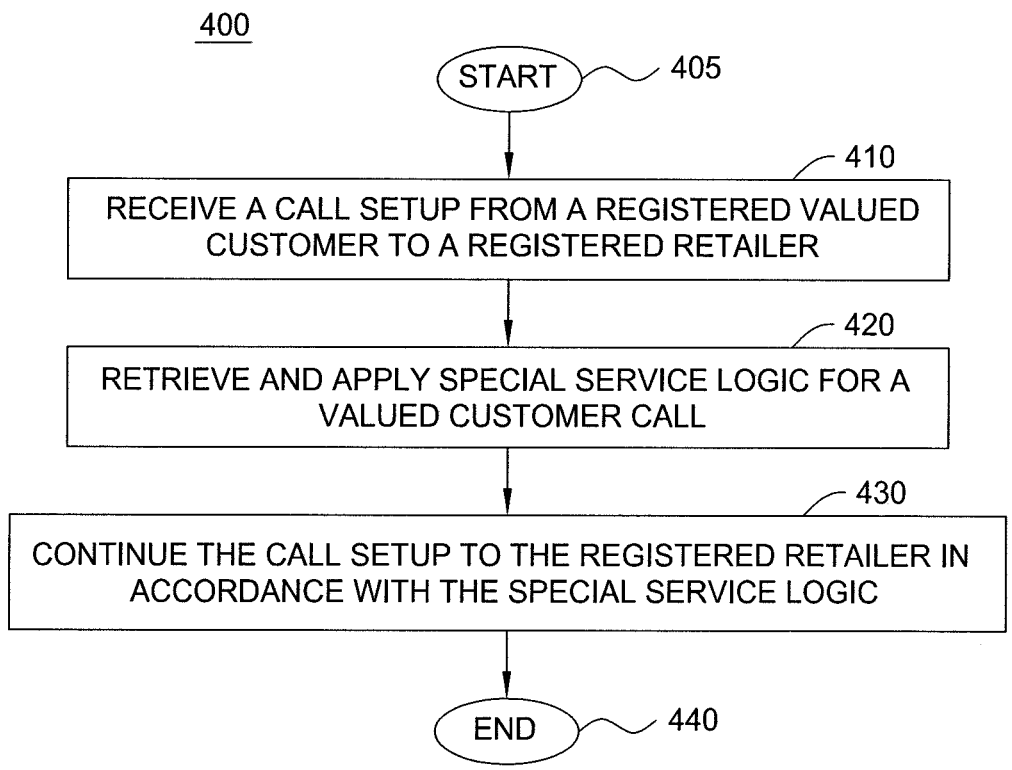
FIG. 4 illustrates a flowchart of a method for special call handling for valued customers of retailers of the present invention.

FIG. 4 illustrates a flowchart of a method 400 for special call handling for valued customers of retailers by the CCE. Method 400 starts in step 405 and proceeds to step 410.

In step 410, the method receives a call setup message from a calling endpoint device, e.g., from a registered valued customer, to a registered retailer that the customer has signed up to be viewed as a valued customer. The CCE communicates with the AS to inquire whether the calling endpoint device, i.e., the calling party is associated with a registered valued customer (or accorded a valued customer status) of the called party and whether the called party is a registered retailer.

In step 420, if the calling party is a valued customer and the called party is a registered retailer, then the method retrieves and applies the registered service logic set by the called registered retailer. The service logic may include, but is not limited to, translating the called number to a different destination phone number (e.g., a preferred translated destination number) depending on the customer status. For instance, a valued customer call can be forwarded to a phone number answered by live attendants and whereas a regular customer call can be forwarded to another phone number answered by an IVR system.

In step 430, the method continues the call setup procedures according to the retrieved service logic to the called registered retailer. Method 400 ends in step 440.

Figure 5:
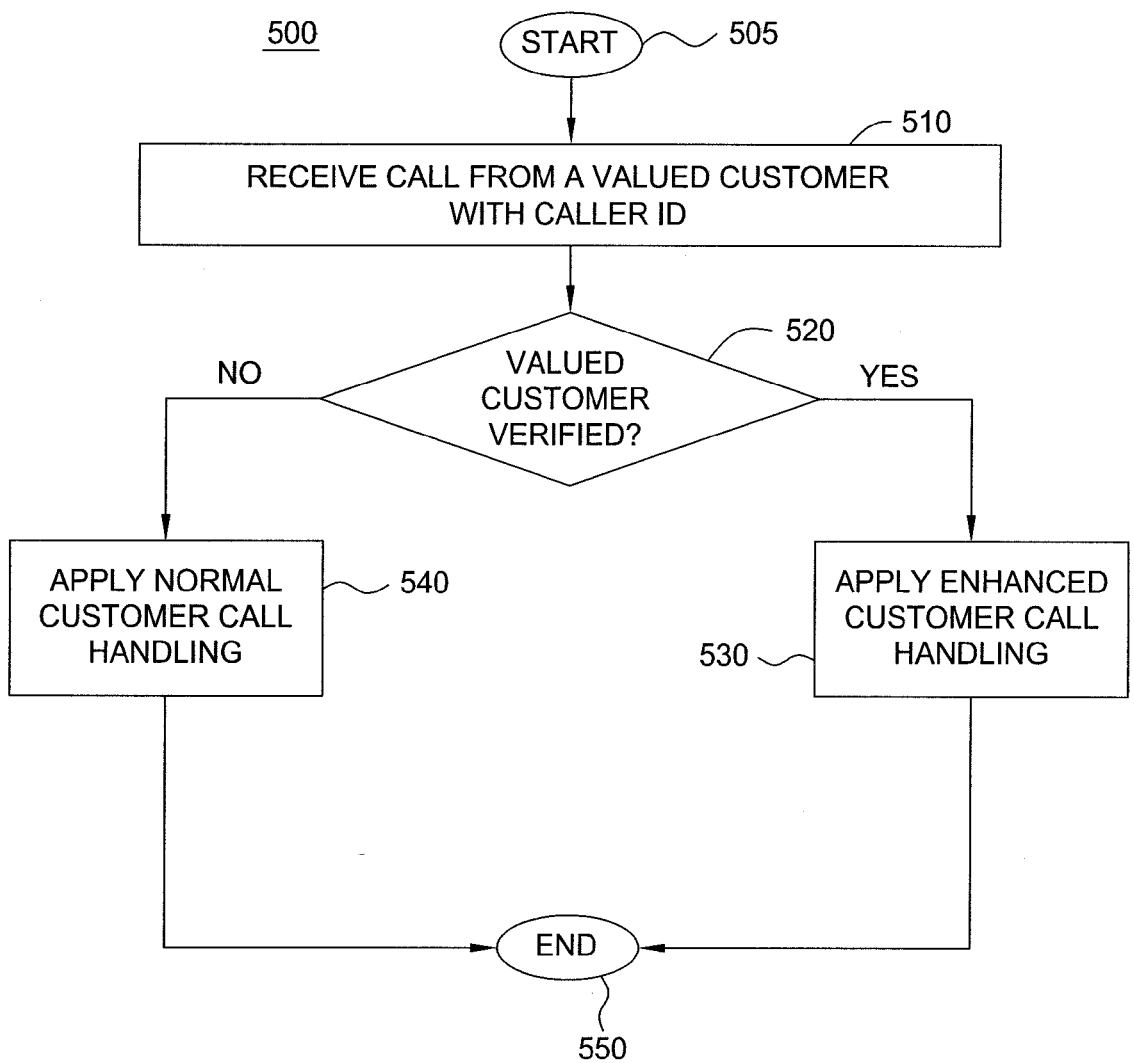
FIG. 5 illustrates a flowchart of a method for handling valued customer call by a retailer of the present invention.

FIG. 5 illustrates a flowchart of a method for handling valued customer calls by a registered retailer. Method 500 starts in step 505 and proceeds to step 510.

In step 510, the method receives a call from a valued customer. In step 520, the method in one embodiment, verifies if the caller is indeed a valued customer by checking customer information including, but not limited to, the customer billing status or revenue history, using the caller ID data. If the customer is a valued customer, the method proceeds to step 530; otherwise, the method proceeds to step 540.

In step 530, the method provides enhanced handling of the customer call. For instance, enhanced call handling may include answering the valued customer call using live attendants.

In step 540, the method provides normal handling of the customer call. For instance, normal call handling may include answering regular customer calls using an IVR system. The method ends in step 550.

Figure 6:
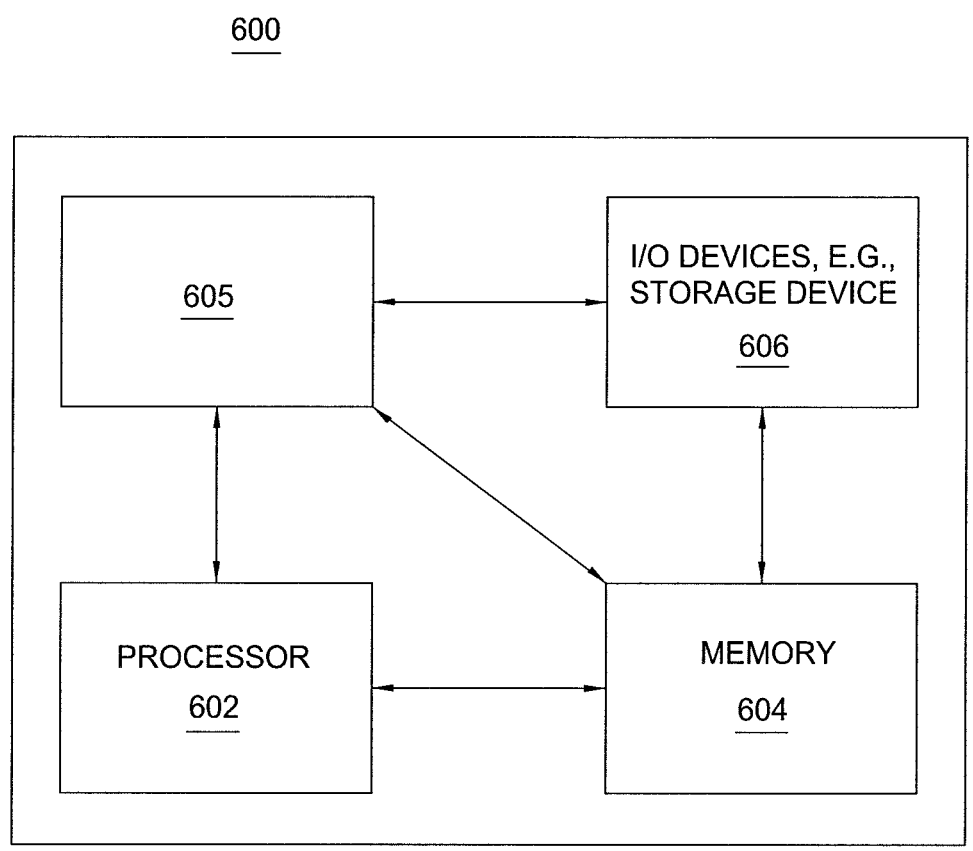
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a special call handling module 605, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present special call handling module or process 605 can be loaded into memory 604 and executed by processor 602 to implement the functions as discussed above. As such, the present special call handling process 605 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a call setup message in a communication network, the method comprising:
   receiving, by a processor in the communication network, the call setup message from an endpoint device of a calling party to a called party;
   verifying, by the processor, the calling party is associated with a valued customer status and the called party is a registered retailer based upon the call setup message; and
   processing, by the processor, the call setup message in accordance with a registered service logic when the calling party is associated with the valued customer status and the called party is the registered retailer instead of processing the call setup message in accordance with a service logic associated with a regular customer status, wherein the registered service logic presents a pre-recorded message of a promotion and directs a call to a live attendant following the pre-recorded message of the promotion being presented.

2. The method of claim 1, wherein the communication network is a voice over internet protocol network.

3. The method of claim 1, further comprising:
   registering a phone number of the calling party as being associated with the valued customer status; and
   registering a phone number of the called party as being associated with the registered retailer.

4. The method of claim 3, wherein the phone number of the called party is a toll-free phone number.

5. The method of claim 3, wherein the phone number of the called party is a toll phone number.

6. The method of claim 1, wherein the calling party being associated with the valued customer status is selectively set by the calling party.

7. The method of claim 1, wherein the calling party being associated with the valued customer status is selectively set by the called party.

8. The method of claim 1, wherein the registered service logic is retrieved from an application server by a call control element.

9. The method of claim 8, wherein the registered service logic further comprises service logic for forwarding the call setup message to a preferred translated destination number set by the called party.

10. The method of claim 1, further comprising:
    sending a caller identification of the calling party to the called party.

11. The method of claim 10, wherein the caller identification is used by the called party to verify the valued customer status.

12. A non-transitory computer-readable medium storing instructions which, when executed by a processor in a communication network, cause the processor to perform operations for processing a call setup message in the communication network, the operations comprising:
    receiving the call setup message from an endpoint device of a calling party to a called party;
    verifying the calling party is associated with a valued customer status and the called party is a registered retailer based upon the call setup message; and
    processing the call setup message in accordance with a registered service logic when the calling party is associated with the valued customer status and the called party is the registered retailer instead of processing the call setup message in accordance with a service logic associated with a regular customer status, wherein the registered service logic presents a pre-recorded message of a promotion and directs a call to a live attendant following the pre-recorded message of the promotion being presented.

13. The non-transitory computer-readable of claim 12, further comprising:
    registering a phone number of the calling party as being associated with the valued customer status; and
    registering a phone number of the called party as being associated with the registered retailer.

14. The non-transitory computer-readable of claim 13, wherein the phone number of the called party is a toll-free phone number.

15. The non-transitory computer-readable of claim 13, wherein the phone number of the called party is a toll phone number.

16. The non-transitory computer-readable of claim 12, wherein the calling party being associated with the valued customer status is selectively set by the calling party.

17. The non-transitory computer-readable of claim 12, wherein the calling party being associated with the valued customer status is selectively set by the called party.

18. The non-transitory computer-readable of claim 12, further comprising:
    sending a caller identification of the calling party to the called party.

19. The non-transitory computer-readable of claim 18, wherein the caller identification is used by the called party to verify the valued customer status.

20. A network element for processing a call setup message, where the network element is deployed in a communication network, the network element comprising:
    a processor; and
    a computer-readable medium storing instructions which, when executed by the processor, cause the processor to perform operations, the operations comprising:
        receiving the call setup message from an endpoint device of a calling party to a called party;
        verifying the calling party is associated with a valued customer status and the called party is a registered retailer based upon the call setup message; and
        processing the call setup message in accordance with a registered service logic when the calling party is associated with the valued customer status and the called party is the registered retailer instead of processing the call setup message in accordance with a service logic associated with a regular customer status, wherein the registered service logic presents a pre-recorded message of a promotion and directs a call to a live attendant following the pre-recorded message of the promotion being presented.

* * * * *